June 7, 1938.  E. H. REMDE  2,120,042
TRANSPORTING EQUIPMENT
Filed July 1, 1936   5 Sheets-Sheet 1
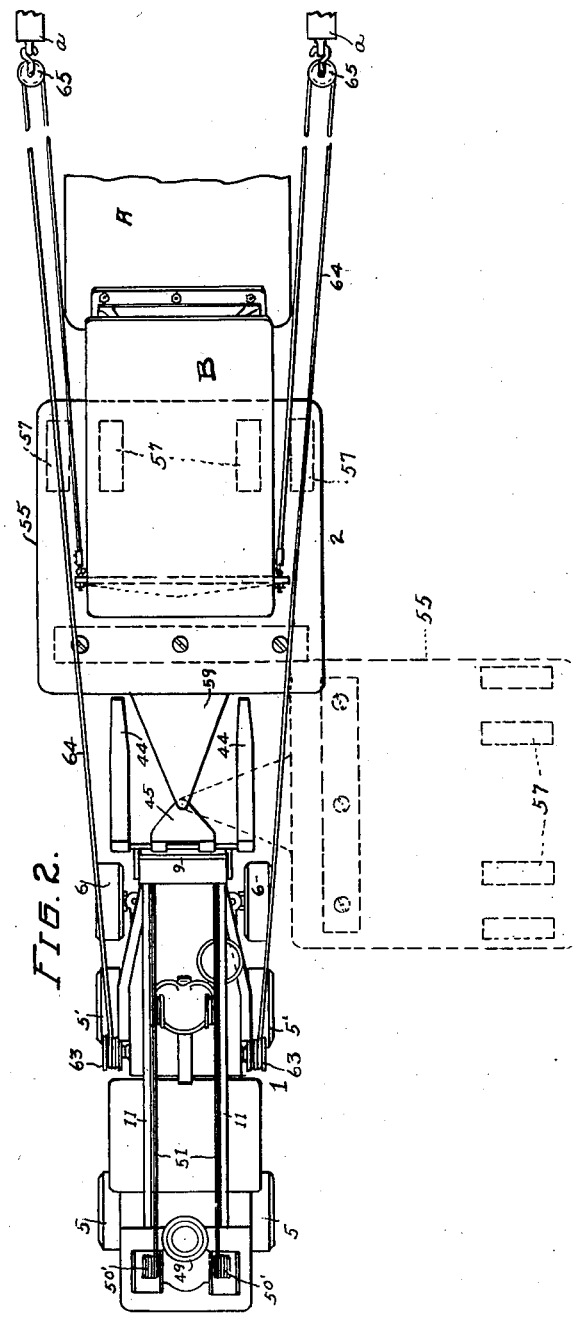
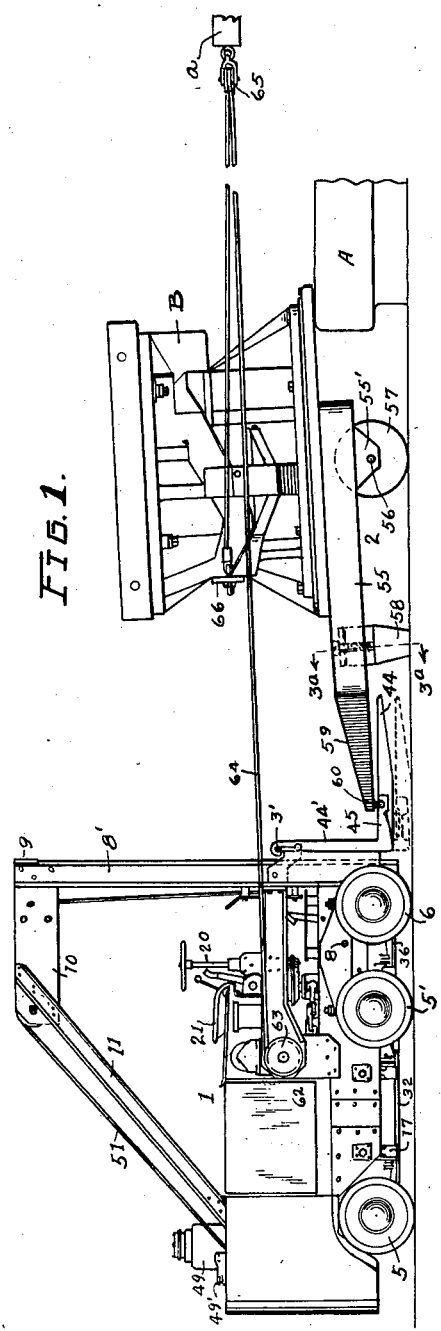
INVENTOR.
EDWARD H. REMDE.
BY
ATTORNEY.

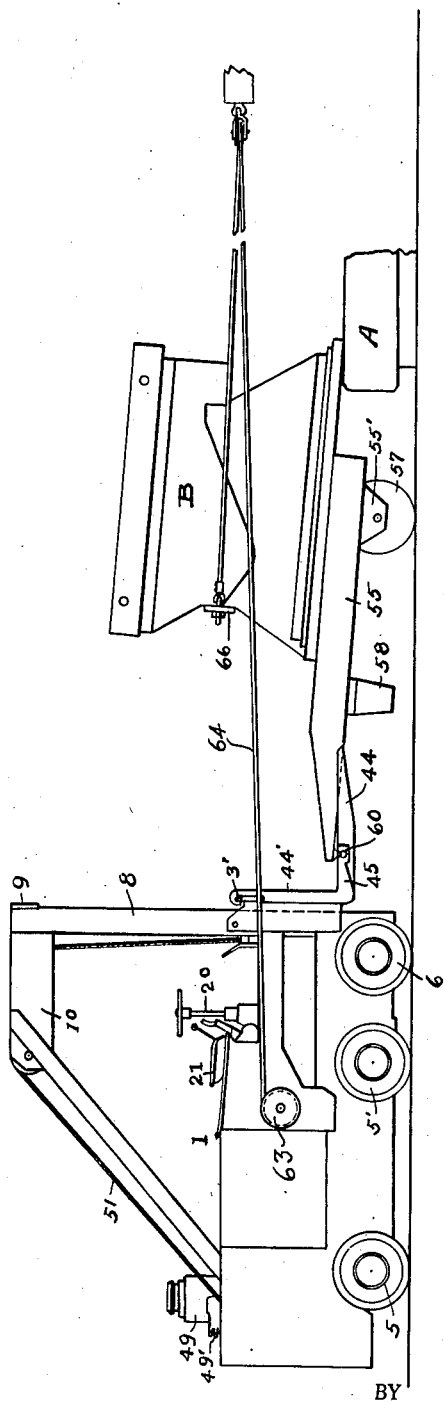

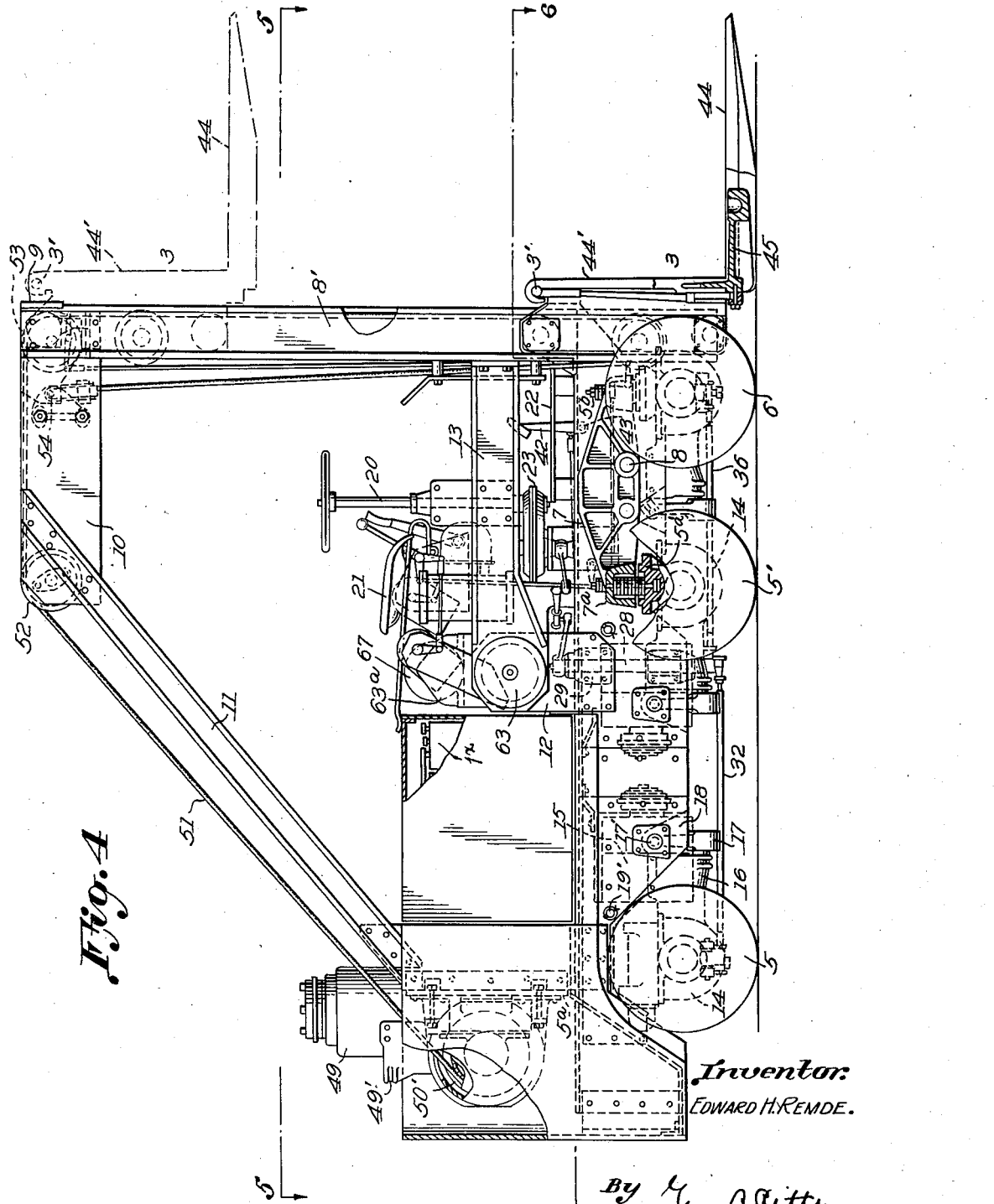

June 7, 1938.  E. H. REMDE  2,120,042
TRANSPORTING EQUIPMENT
Filed July 1, 1936  5 Sheets-Sheet 4

Inventor:
EDWARD H. REMDE

By Geo. B. Pitts
Attorney.

June 7, 1938.  E. H. REMDE  2,120,042
TRANSPORTING EQUIPMENT
Filed July 1, 1936   5 Sheets-Sheet 5

Inventor:
EDWARD H. REMDE
By Geo. B. Pitts
Attorney.

Patented June 7, 1938

2,120,042

UNITED STATES PATENT OFFICE 2,120,042

TRANSPORTING EQUIPMENT

Edward H. Remde, Cleveland, Ohio, assignor to The Baker-Raulang Company, Cleveland, Ohio, a corporation of Ohio Application July 1, 1936, Serial No. 88,409

16 Claims. (Cl. 214—65)

This invention relates to load transporting equipment constructed to handle loads wherein (a) the latter are bodily engaged, elevated and transported and/or (b) the load is moved onto a portable auxiliary carrier, transported and removed, whereby loads large in size or heavy in weight or both large and heavy may be handled and transported with minimum expense, labor and time.

One object of the invention is to provide in equipment of this character an improved truck operable independently or with an auxiliary carrier and in which the supporting wheels for the truck and the steering and driving of certain thereof are arranged to carry loads of the character mentioned efficiently under all conditions and at the same time to provide for easy and adequate sharp turning and driving without undue wear on the wheels which carry the major portion of the load weight.

Another object of the invention is to construct in equipment of this character an improved truck in which the load carrying end of the truck frame is supported by outer and inner pairs of wheels mounted on trunnioned sub-frame members and to provide for the driving of the inner pair of wheels and steering of the outer pair of wheels and the wheel or wheels supporting the opposite end of the truck frame, whereby tractive effort is insured, sharp and easy steering is effected and the weight of the load is distributed over a large supporting area on the floor or ground.

Another object of the invention is to construct an improved transporting equipment comprising a combined operating and carrying unit and an auxiliary carrying unit, the operating unit being constructed to effect transportation of the load when supported on either unit.

Another object of the invention is to construct an improved transporting equipment comprising an operating and controlling unit and an auxiliary member for carrying a load, the operating unit being provided with means for moving the load onto and off the auxiliary member and for attachment thereto for travel.

A further object of the invention is to construct an improved truck wherein the load carrying end of the frame is mounted on pairs of inner and outer wheels, one pair of which is driven, said pairs of wheels being connected to the frame in a manner to so distribute the load weight on said wheels that no undue strains are imparted to the power transmitting mechanism for the driven wheels incident to driving and starting or stopping thereof.

A still further object of the invention is to provide an improved carrier supported at one end on wheels and normally supported at its other end on a leg and adapted to be removably connected to the elevating member of a portable carrying unit, whereby the leg supporting end of the carrier may be lifted and the latter transported.

Other objects of the invention will be apparent to those skilled in the art to which my invention relates from the following description taken in connection with the accompanying drawings, wherein Fig. 1 is a side elevation of a transporting equipment embodying my invention, with parts in position illustrating the operation of removing a load from the auxiliary carrier.

Fig. 2 is a plan view.

Fig. 3 is a view similar to Fig. 1 but showing the moving of a load off the auxiliary carrier under different conditions.

Fig. 3a is a section on the line 3a—3a of Fig. 1.

Fig. 4 is a side elevation of the truck, which forms a part of the equipment, enlarged.

Figure 5:
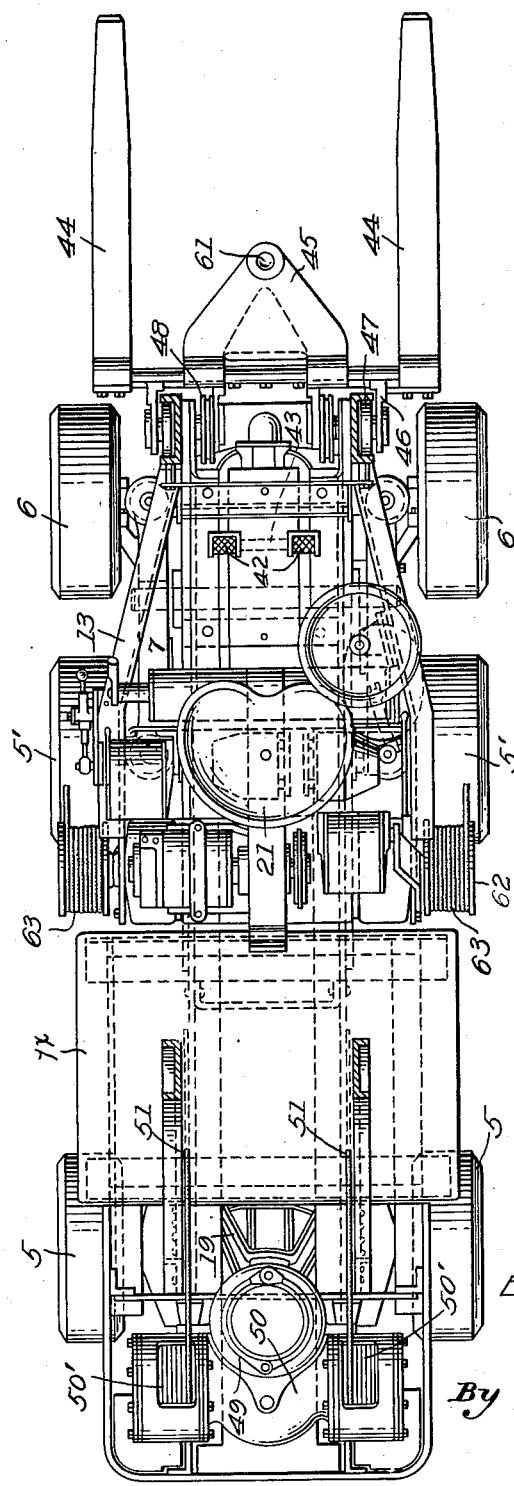
Fig. 5 is a section on the line 5—5 of Fig. 4.

In the drawings, 1 indicates as an entirety the combined operating and carrying unit and 2 indicates as an entirety the auxiliary carrying unit, the unit 1 being constructed to bodily elevate and transport loads independently of the auxiliary unit and to move loads on and off the auxiliary unit and to engage and transport the latter from place to place.

Figure 6:
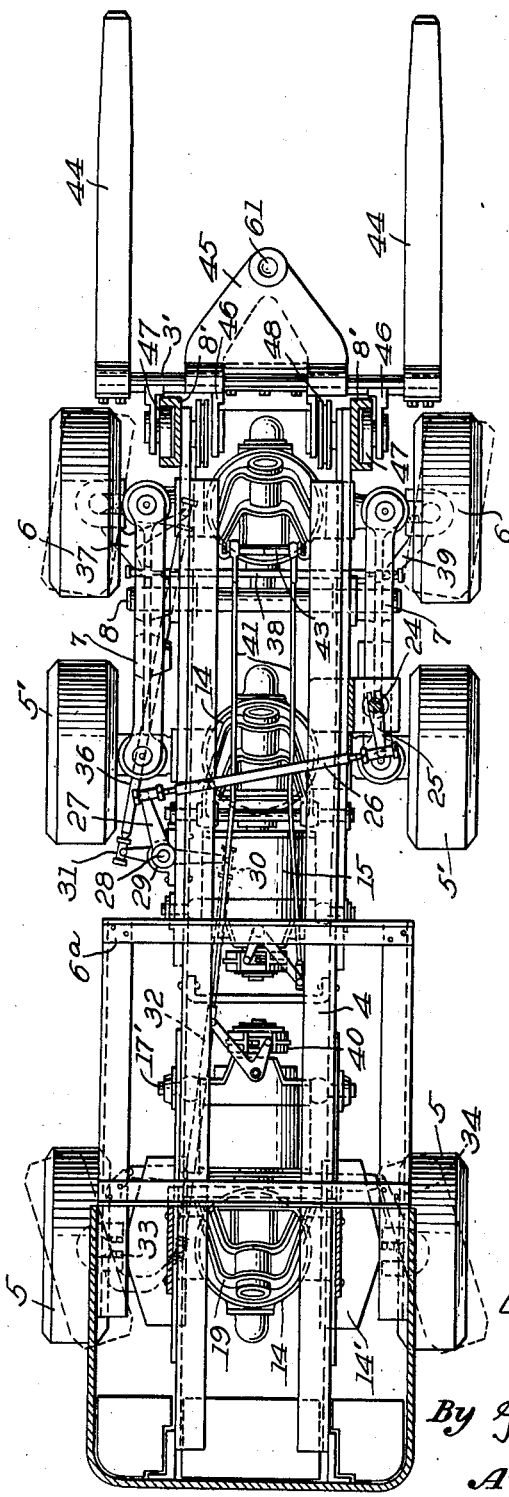
Fig. 6 is a section on the line 6—6 of Fig. 4.

The unit 1 comprises a driven truck provided with a power operated elevating member 3 constructed as follows: 4 indicates a frame supported at its rear end by a pair of wheels 5 and at its front end by inner and outer pairs of wheels 5', 6, the adjacent wheels 5', 6, at each side of the frame 4 being mounted on the outer ends of a sub-frame 7, which is trunnioned on a transverse shaft 8 supported on the frame 4 and extending beyond the opposite sides thereof (see Figs. 5 and 6). The trunnion for the sub-frame members 7 is disposed nearer one pair of the adjacent wheels than the other pair for a purpose later explained. At its rear end, the frame 4 is provided with uprights 5ª, for a purpose later set forth, and forward of the uprights 5ª, the frame is provided with cross members 6ª for supporting the power means, which, in the illustrated disclosure, consist of electric storage batteries 1ˣ for supplying current to the motors later referred to. At its front end the frame 4 is provided with a guide frame preferably comprising a pair of channels 8' on which the elevating member 3 is mounted for vertical movement, as hereinafter described. The upper ends of the channels 8' are connected by a cross bar 9 and each is provided with a rearwardly extending plate 10, connected by a bar 11 to the adjacent upright 5ᵃ whereby the channel is rigidly braced. 12 indicates a pair of side plates extending upwardly from the frame 4, these plates being connected by channels 13 to the guide channels 8', whereby the side plates are held in rigid position. The wheels 5 are mounted on knuckles for steering purposes and connected to a power transmitting mechanism within a housing 14, such mechanism being driven by a motor 15. The motor 15 is rigidly mounted on a tail member 16 integrally connected to the housing 14. The housing 14, tail member 16 and motor 15 are connected to the frame 4 (a) by a torque member 17 pivoted at its opposite ends at 17' to plates 18 depending from the frame 4 and pivoted by a universal joint intermediate its ends to the tail member 16 and (b) by a driving member 19, pivoted at its opposite ends at 19' to the plates 18 and pivoted by a universal joint intermediate its ends to the housing 14.

The frame 4 is yieldably supported on the axle housings extending from the opposite sides of the housing 14 in any desired manner; but for purposes of illustration I provide between a seat on each axle housing and a plate on the frame cushions 14' and connect the seat and plate together in a suitable manner to limit the movement of the frame upwardly.

The driving mechanism for the wheels 5' and the connection of the driving mechanism and housing with the frame 4 are similar to that above described for the wheels 5, except that the wheels 5' are non-steerably mounted at the outer ends of the axle housings extending from the adjacent housing 14, whereas the wheels 5 are knuckle mounted on the adjacent axle housings. Separate motors supplied with current from the batteries 1ˣ, are preferably provided for driving the wheels 5 and 5'. The wheels 6 are steerably mounted on the adjacent axle housings similarly to the wheels 5, the housing 14 between these axle housings being connected to the frame 4 by a torque member 17ᵃ mounted similarly to the member 17. As the wheels 6 are not driven, the motor and driving mechanism within the adjacent housing 14 are omitted. The connections between the frame 4 and housings 14 for the wheels 5, 5', 6 and the driving mechanisms for the wheels 5, 5' are preferably constructed similar to corresponding parts shown in and forming the subject-matter of Patent No. 1,628,145 granted to me and John H. Hertner, jointly, and reference may be made thereto for a more detailed description of these parts.

The steering mechanism for the pairs of wheels 5, 6, comprises a steering column 20 in operative relation to the driver's seat 21 and platform 22. The lower end of the column operates through suitable gearing within a casing 23 to rotate a vertical shaft 24. The shaft is provided with an arm 25, which is connected by a rod 26 to an arm 27, the latter being fixed to a vertical shaft 28 supported in suitable bearings 29. The shaft 28 is provided with two arms 30, 31, the former being connected by a rod 32 to the outer end of an arm 33 fixed to the spindle of the adjacent wheel 5. As the spindles for the wheels 5 are connected for simultaneous movement by arms 34 and a connector 35 extending between them, it will be seen that the operation of the rod 32 will steer both wheels in the desired direction. The arm 31 is connected by a rod 36 to an arm 37 fixed to the spindle for the adjacent wheel 6 and as this arm 37 is connected by a connector 38 to an arm 39 fixed to the spindle of the other wheel 6, operation of the rod 36 will steer both wheels 6 in the desired direction. As shown in Fig. 6, the connections above described are arranged to steer both pairs of wheels 5, 6, simultaneously but in opposite directions and in such relation as to effect steering about a common center.

Each motor 15 is provided with a brake wheel normally engaged by a spring operated band 40, connected by a rod 41 to a suitable pedal 42. The pedals 42 are fixed to a shaft 43, so that when either pedal is operated to release the adjacent brake band 40, the other brake band will be simultaneously released.

Each of the wheels 5', 6, is yieldingly mounted on one end of the adjacent sub-frame member 7. For this purpose the outer end of the adjacent axle housing is provided with an apertured circular seat 5ᵃ' and the adjacent end of the member 7 is shaped to form an inverted cup-shaped chamber 7ᵃ and between the seat 5ᵃ' and bottom of the chamber 7ᵃ I provide a plurality of superimposed rubber pads 7'. A bolt 5ᵇ extends through the aperture in the seat and alined openings in the pads 7' and an opening in the bottom of the recess to connect the axle housing and member together; the walls of the chamber 7ᵃ serving to enclose the uppermost pads 7'.

The elevating member 3 consists of a main vertical portion and horizontal supporting elements, for example, spaced forks 44 and an intermediate device 45 to which reference will later be made. In the preferred arrangement, the vertical portion is provided with a cross rod 3' and the supporting elements are provided with vertical sections 44' each terminating in a hook adapted to removably engage the rod 3', so that various types of supporting elements may be substituted for use, as desired. The vertical portion of the elevating member 3 is provided with rearward extending brackets 46, the outer ones supporting pairs of guide rollers 47 which engage the walls of the channels 8' to slidably support the member 3 thereon. The inner brackets 46 support suitable sheaves 48 forming part of the raising and lowering means for the elevating member 3, these means preferably comprising the following: 49 indicates a motor supplied with current from the batteries 1ˣ and suitably secured to a wall or casting 49'. The casting 49' may be formed integrally with the housing 50 for a power mechanism which is driven by the motor 49 and through it drives a pair of winding drums 50' for a pair of flexible members 51, such as wire cables. The housing 50 is secured to the uprights 5ᵃ. The cables 51 are guided over pairs of sheaves 52, 53 (the latter being arranged at the upper ends of the channels 8') to the sheaves 48 and reeve around the latter; the free ends of the cables being connected to a cross member 54 supported between the plates 10.

The elevating member 3 may be operated upwardly and downwardly for bodily handling loads equal in weight to the rated capacity of the truck structure and also operated to (a) raise and lower the inner end of the auxiliary unit 2 for positioning its outer end in operative relation to a bolster plate A or other support, as shown in Figs. 1 and 3 and (b) also engage and raise the inner end of the auxiliary unit 2 clear of the floor or ground and then move the unit from place to place with or without a load thereon.

The auxiliary unit 2 comprises a frame 55 having near its rear end depending members 55', provided with suitable bearings for a shaft 56, on which supporting wheels (preferably four wheels—see Fig. 2) 57 are free to rotate. Near its forward end the frame is provided with a supporting leg—preferably two spaced legs 58, as shown in Fig. 3a. The legs 58 are preferably adjustable so that they may be made long or short with respect to the frame 55 and accordingly, when engaged with the floor or ground, cooperate with the wheels 57 to support the frame 55 substantially horizontally or in an inclined position (see Fig. 1). The inner end of the frame 55 is provided with an extension 59 having on its free end a depending connector 60, preferably of substantially spherical shape, adapted to removably and pivotally fit into a recess 61 formed in the outer end of the supporting device 45, whereby relative turning movement between them may take place when the units travel in either direction. To connect the unit 1 to the unit 2, the elevating member 3 is lowered to dispose the device 45 below the level of the connector 60, then the unit 1 is driven forwardly until the recess 61 is alined with the connector, following which the elevating member 3 is raised, the effect of which is to connect the device 45 and unit 2 together. If this raising movement is continued after these parts are in connected relation, the inner end of the frame 55 will be lifted to disengage its legs from the floor and then the unit 1 may be driven in either direction and thus push or pull as well as steer the unit 2 on the wheels 57. As the device 45 is not below the plane of the forks 44 and the extension 59 is above the forks and the connector 60 depends from the latter, the unit 1 may be driven forwardly at an angle to the unit 2 to position the device 45 below the connector 60. As the extension 59 has a length greater than the distance from the recess 61 to either lateral surface of the unit 1, the latter may be driven along a line at right angles to the unit 2 to effect a connection therewith. This capability will be understood from Fig. 2, where the unit 2 is shown in dotted lines at right angles to the unit 1. The adjustment of the carrier legs 58 may be effected by forming the legs 58 integral with a cross member 58' and providing between such member and the frame a spacer 58b, the cross member and spacer being connected to the frame by bolts 58a the heads of which are countersunk in the frame. By providing a spacer 58b of greater or lesser height the length of the legs is varied. The legs 58 serve to support the inner end of the frame 55, so that the device 45 may be projected below the connector 60 and then engaged therewith. By provision of the adjustment referred to, the legs 58 may be shortened so that the elevating member may lower the inner end of the carrier sufficiently to relate its outer end to bolster plates of different heights.

It will be understood that by the provision of two pairs of wheels 5', 6, at the load carrying end of the truck 1, relatively heavy loads may be engaged by the elevating member 3, raised and transported to any desired location, but where the weight of the load exceeds the carrying capacity of the truck or because of its shape and size, the truck and its elevating member 3, in combination with the auxiliary unit 2 may be operated to engage and transport such a load. In this arrangement, large massive bodies, such as dies B, weighing many tons, may be supported and transported from a place of storage to the place of use readily and economically. This operation is possible since the weight of the dies is carried partly by the frame 55 and supporting wheels 57 therefor and partly by the truck 1. Accordingly, the truck 1 may, in combination with a simplified auxiliary, wheel mounted unit, operate to transport loads far in excess of its carrying capacity. This arrangement is obviously advantageous for many reasons; namely, the initial cost, up-keep and operating expenses are less than for a truck having a capacity to transport heavy loads such as herein referred to and such a truck adapts itself to various kinds of loading, transporting and unloading operations and being lighter in weight it may be driven with greater facility on floors and structures incapable of supporting unduly heavy bodies.

It will be noted that the trunnion 8 for the subframe 7 is disposed nearer the axis for the wheels 6 than the axis for the wheels 5' so that a greater portion of any load carried by the member 3, either bodily thereon or indirectly by its connection with the unit 2, will be borne by the wheels 6. This arrangement is particularly advantageous where the wheels 5' are driven since it relieves undue strains on these wheels and their power transmitting elements in starting and stopping the motor 15 therefor. This arrangement is also advantageous as a greater portion of the rear end of the truck may be utilized to counterbalance the load on the member 3.

It will thus be seen that in my construction of truck I provide for relatively sharp turning by providing steering wheels at the front and rear ends of the frame 4 and that I also provide for ample driving power, by means of driven wheels 5, 5', also disposed at opposite ends of the frame 4, without imposing undue strains on those driven wheels which are at the load carrying end thereof, whereby loads weighing many tons may be carried and transported.

The truck 1 is provided with mechanism 62 which may be engaged with the dies B to move them off the unit 2 onto a support A, as shown in Figs. 1 and 3 or from the support A onto the unit 2. The mechanism 62 comprises a pair of power driven drums 63 and cables 64 which wind thereon and thereoff. Where the dies are to be moved from the frame 55 onto a support A, the cables 64 are guided by suitable pulleys 65, which are suitably mounted on fixed supports a, a, their free ends preferably being connected to a device 66, which engages the dies.

The supports a, a, are shown diagrammatically, but may consist of any stationary object in the vicinity of the place where the unloading operation is to take place, such as a supporting column or the frame members forming a part of the press for the die. Where the dies are to be moved from the support A onto the frame 55, the device 66 is placed at the rear of the dies and the cable ends are connected directly thereto. When the support A is of less height than that of the frame 55 in the plane of the axle for the wheels 57, the frame 55 is positioned as shown in Fig. 3 when moving the dies off the frame 55, so that the advancing edge of the lower die will engage the support beyond its outer edge; but when moving the dies from the support onto the frame 55 the latter is inclined at a greater angle so that the advancing edge of the lower die will engage the frame 55 beyond its outer edge. Where the height of the support A is greater than that of the frame 55 in this plane, in moving the dies onto or off the support A, the frame 55 is positioned as shown in Fig. 1, the legs 58 being adjusted to permit of this relation of the frame 55 to the support A.

When moving a load on or off the carrier 2, the connector 60 and device 45 serve to hold it against movement.

The drums 63 are connected to shafts driven in either direction through suitable power transmitting mechanism and reduction gearing, within a housing 63a, by a motor 67, which is supplied with current from the batteries 1x. The motor, power transmitting mechanism and reduction gearing are similar in construction to corresponding parts shown in Letters Patent No. 1,661,387, dated March 6, 1928, for which reason further illustration and description thereof herein is not required.

To those skilled in the art to which my invention relates many changes in construction and widely differing embodiments and applications of the invention will suggest themselves without departing from the spirit and scope thereof. My disclosures herein are purely illustrative and not intended to be in any sense limiting.

What I claim is:

1. In an industrial truck, the combination of a frame, a pair of wheels for supporting one end portion of said frame, a sub-frame fulcrumed on the opposite end portion of said frame and provided with a pair of wheels at each end thereof, load elevating means supported on the latter end portion of said frame, means for driving the first mentioned pair of wheels, means carried by said frame and drivingly connected to the axle for one of said pairs of wheels provided on said sub-frame, and means for steering certain of said pairs of wheels.

2. In an industrial truck, the combination of a frame, a pair of wheels for supporting one end portion of said frame, a sub-frame fulcrumed on the opposite end portion of said frame and provided with a pair of wheels at each end thereof, load elevating means supported on the latter end portion of said frame outwardly of said sub-frame, means for steering the first mentioned pair of wheels and one of said pairs of wheels provided on said sub-frame, and means for driving certain of said pairs of wheels.

3. In an industrial truck, the combination of a frame, a pair of wheels for supporting one end portion of said frame, a sub-frame fulcrumed on the opposite end portion of said frame and provided with a pair of wheels at each end thereof, load elevating means supported on the latter end portion of said frame, means for driving the first mentioned pair of wheels, means carried by said frame and drivingly connected to the axle for one of said pairs of wheels provided on said sub-frame, and means for steering said first mentioned pair of wheels and the other pair of wheels provided on said sub-frame.

4. In an industrial truck, the combination of a frame, a pair of wheels for supporting one end portion of said frame, a sub-frame transversely fulcrumed on the opposite end portion of said frame and provided with a pair of wheels at each end thereof, load elevating means supported on the latter end portion of said frame, means for driving the first mentioned pair of wheels, means carried by said frame and drivingly connected to the axle for the pair of wheels provided on the inner end of said sub-frame, and means for steering certain of said pairs of wheels.

5. In an industrial truck, the combination of a frame, a pair of wheels for supporting one end portion of said frame, a sub-frame transversely fulcrumed on the opposite end portion of said frame and provided with a pair of wheels at each end thereof, load elevating means supported on the latter end portion of said frame, means for driving the first mentioned pair of wheels, means carried by said frame and drivingly connected to the axle for the inner pair of wheels provided on said sub-frame, and means for steering said first mentioned pair of wheels and the pair of wheels provided on the outer end of said sub-frame.

6. In an industrial truck, the combination of a frame, a pair of wheels for supporting one end portion of said frame, a sub-frame transversely fulcrumed on the opposite end portion of said frame and provided with pairs of wheels at its inner and outer ends, the axis of the fulcrum being disposed nearer the outer end of said sub-frame than its inner end, load elevating means supported on the latter end portion of said frame, means for driving the first mentioned pair of wheels and one of said pairs of wheels provided on said sub-frame, and means for steering said first mentioned pair of wheels and the other pair of wheels provided on said sub-frame.

7. In an industrial truck, the combination of a frame, a pair of wheels for supporting one end portion of said frame, a sub-frame transversely fulcrumed on the opposite end portion of said frame and provided with pairs of wheels at its inner and outer ends, the axis of the fulcrum being disposed nearer the outer end of said sub-frame than its inner end, load elevating means supported on the latter end portion of said frame, means for driving the first mentioned pair of wheels and the inner pair of wheels provided on said sub-frame, and means for steering said first mentioned pair of wheels and the pair of wheels provided on the outer end of said sub-frame.

8. In an industrial truck, the combination of a frame, a pair of wheels for supporting one end portion of said frame, a sub-frame transversely fulcrumed on the opposite end portion of said frame and provided with pairs of wheels at its inner and outer ends, load elevating means supported on the latter end portion of said frame and comprising guides, an elevating member movably mounted on said guides and provided with load engaging elements and an element adapted to be connected to an auxiliary carrier, power means for raising and lowering said member, means for driving the first mentioned pair of wheels and the inner pair of wheels provided on said sub-frame, and means for steering said first mentioned pair of wheels and the pair of wheels provided on the outer end of said sub-frame.

9. In an industrial truck, the combination of a frame, a pair of wheels for supporting one end portion of said frame, a sub-frame transversely fulcrumed on the opposite end portion of said frame and provided with pairs of wheels at its inner and outer ends, load elevating means supported on the latter end portion of said frame and comprising guides, an elevating member movably mounted on said guides and provided with load engaging elements and an element adapted to be connected to an auxiliary carrier, power means for raising and lowering said member, means for driving the first mentioned pair of wheels and the inner pair of wheels provided on said sub-frame, means for steering said first mentioned pair of wheels and the pair of wheels provided on the outer end of said sub-frame, and means on said frame for moving a load on or off an auxiliary carrier.

10. In an industrial truck, the combination of a frame, a pair of wheels for supporting one end portion said frame, a sub-frame transversely fulcrumed on the opposite end portion of said frame and provided with pairs of wheels at its inner and outer ends, load elevating means supported on the latter end portion of said frame and comprising guides disposed at the free end of the adjacent end portion of said frame, an elevating member movably mounted on said guides and provided with load engaging elements, power means including a winding drum mounted on the opposite end portion of said frame to counterbalance loads on said member and a flexible member connected to said elevating member and arranged to wind on and off said drum, means for driving the first mentioned pair of wheels and the inner pair of wheels provided on said sub-frame, and means for steering said first mentioned pair of wheels and the pair of wheels provided on the outer end of said sub-frame.

11. In an industrial truck, the combination of a frame, a pair of wheels for supporting one end portion of said frame, a sub-frame transversely fulcrumed on the opposite end portion of said frame and provided with pairs of wheels at its inner and outer ends, the axis of the fulcrum being disposed nearer one end of said sub-frame than its other end, load elevating means supported on the latter end portion of said frame, means for driving the first mentioned pair of wheels and one of said pairs of wheels provided on said sub-frame, and means for steering said first mentioned pair of wheels and the other pair of wheels provided on said sub-frame.

12. In an industrial truck, the combination of a frame, a pair of wheels for supporting one end portion of said frame, a sub-frame transversely fulcrumed on the opposite end portion of said frame and provided with pairs of wheels at its inner and outer ends, load elevating means supported on the latter end portion of said frame and comprising guides, an elevating member movably mounted on said guides and provided with an element adapted to be connected to an auxiliary carrier, power means for raising and lowering said member, means for driving the first mentioned pair of wheels and the inner pair of wheels provided on said sub-frame, and means for steering said first mentioned pair of wheels and the pair of wheels provided on the outer end of said sub-frame.

13. In an industrial truck, the combination of a frame, a pair of wheels for supporting one end portion of said frame, a sub-frame transversely fulcrumed on the opposite end portion of said frame and provided with pairs of wheels at its inner and outer ends, the axis of the fulcrum being disposed nearer the outer end of said sub-frame than its inner end, the inner pair of wheels being non-steerably carried by the inner end of said sub-frame and the outer pair of wheels being steerably mounted on the outer end of said sub-frame, load elevating means supported on the latter end portion of said frame, means for driving the first mentioned pair of wheels and said non-steerably mounted pair of wheels provided on said sub-frame, and means for steering said first mentioned pair of wheels and the other pair of wheels provided on the outer end of said sub-frame.

14. In an industrial truck, the combination of a frame having at one end a pair of upright guide members, power means mounted on the opposite end of said frame, wheel supporting means at each end of said frame, the wheels of said supporting means at that end of said frame remote from said upright guide members being steerable and said wheel supporting means adjacent said upright guide members including a pair of non-steerable wheels arranged inwardly of said upright guide members, an elevating member movably mounted on said upright guide members, driving connections between said power means and said non-steerable wheels, operating connections between said power means and said elevating member for operating the latter, and separate devices on said frame and arranged between said upright guide members and said power means for steering said steerable wheels, controlling said driving connections and controlling said operating connections.

15. In an industrial truck, the combination of a frame having at one end a pair of spaced upright guide members, power means mounted on the opposite end of said frame, wheel supporting means at each end of said frame, the wheels of said supporting means at that end of said frame remote from said upright guide members being steerable and said wheel supporting means adjacent said upright guide members including a pair of non-steerable wheels arranged inwardly of said upright guide members, an elevating member movably mounted on said upright guide members, driving connections between said power means and said non-steerable wheels, operating connections between said power means and said elevating member for operating the latter, said power means being spaced from said upright guide members to provide a driver's station therebetween on said frame, and separate devices on said frame and associated with said station for steering said steerable wheels, controlling said driving connections and controlling said operating connections.

16. In an industrial truck, the combination of a frame having at one end a pair of spaced upright guide members portions of which extend to a point below said frame, power means mounted on the opposite end of said frame, wheel supporting means at each end of said frame, the wheels of said supporting means at that end of said frame remote from said upright guide members being steerable and said wheel supporting means adjacent said upright guide members including a pair of non-steerable wheels arranged inwardly of said upright guide members, an elevating member movably mounted on said upright guide members, driving connections between said power means and said non-steerable wheels, operating connections between said power means and said elevating member for operating the latter, said power means being spaced from said upright guide members to provide a driver's station therebetween on said frame, and separate devices on said frame and associated with said station for steering said steerable wheels, controlling said driving connections and controlling said operating connections.

EDWARD H. REMDE.